United States Patent [19]

Jelinek

[11] Patent Number: 5,011,162
[45] Date of Patent: Apr. 30, 1991

[54] BI-LOBED SEALING ELEMENT AND RETAINER

[75] Inventor: Jerry G. Jelinek, La Habra, Calif.

[73] Assignee: Parker Hannifin Corporation, Cleveland, Ohio

[21] Appl. No.: 382,458

[22] Filed: Jul. 20, 1989

[51] Int. Cl.$^5$ ............................................. F16J 15/12
[52] U.S. Cl. ..................................... 277/11; 277/166; 277/180; 277/189; 411/369; 411/542
[58] Field of Search .................. 277/166, 167.5, 178, 277/179, 180, 181, 183, 189, 211, 235 R, 11, 168, 235 B; 220/357, 358; 411/369, 533, 542, 915

[56] References Cited

U.S. PATENT DOCUMENTS

| | | | |
|---|---|---|---|
| 794,987 | 7/1905 | Kneuper | 277/168 X |
| 2,795,444 | 6/1957 | Nenzell | 277/180 |
| 3,448,986 | 6/1969 | Jelinek et al. | 277/180 |
| 3,519,279 | 7/1970 | Wagner | 277/166 |
| 3,578,346 | 5/1971 | Jelinek | 277/180 |
| 3,661,046 | 5/1972 | Waud et al. | 277/166 X |
| 3,720,420 | 3/1973 | Jelinek et al. | 277/180 |
| 4,026,565 | 5/1977 | Jelinek | 277/235 B X |
| 4,059,289 | 11/1977 | Morris et al. | 277/180 X |
| 4,114,906 | 9/1978 | Jelinek | 277/235 B X |
| 4,191,389 | 3/1980 | Jelinek | 277/166 |
| 4,298,206 | 11/1981 | Kojima | 277/211 X |
| 4,345,739 | 8/1982 | Wheatley | 277/166 X |
| 4,702,657 | 10/1987 | Jelinek | 411/369 |
| 4,712,802 | 12/1987 | Hewison et al. | 277/166 X |

Primary Examiner—William A. Cuchlinski, Jr.
Assistant Examiner—Scott Cummings
Attorney, Agent, or Firm—Leonard L. Lewis

[57] ABSTRACT

An elastomeric sealing device for sealing a fluid opening of passageway at the interface of two mateable parts comprises a bi-lobed elastomeric seal integrally molded on a relatively rigid retainer. The retainer is generally planar in construction with a peripheral load bearing portion that is clamped between the facing sealing surfaces of the mated parts, and an inwardly extending thinner flange portion which is imbedded in the molded bi-lobed seal. The bi-lobed seal is of unitary construction and has a first lobe which extends perpendicularly from one side of the retainer and is sized and shaped to be received in a recess or groove in the sealing surface of one of the mated parts. The seal has a second lobe which extends inwardly and transversely from the first lobe and is sized and shaped to form an interference fit with a boss on the other mated part. The second lobe also includes a generally flat portion closely spaced from the retainer load bearing portion to seal the facing sealing surface of the other mated part.

5 Claims, 3 Drawing Sheets

BI-LOBED SEALING ELEMENT AND RETAINER

BACKGROUND OF THE INVENTION

The invention relates generally to static sealing devices for fluid passageways. More specifically, the invention relates to static face-type seals for mateable parts in which one of the parts has a groove or indentation about a fluid passageway.

Static face seal designs which use O-rings retained in grooves are common and generally effective and simple to use for mateable parts. However, there are several inherent problems with the conventional static face seal such as the possibility of pinching or cutting the O-ring by failing to properly place the O-ring in the groove. Another problem is the inherent inability to know whether an O-ring is in fact present once the parts have been mated together.

Other problems that can arise may be application specific such as the need to insert the O-ring in a "blind" assembly operation, or the possibility that during assembly or closure the O-ring could partially or completely fall out of the groove.

Other limitations of conventional static face seals are finish tolerances on the mating surfaces and the groove to insure an adequate seal, as well as a general inability to automate O-ring insertion due to relative flimsiness of the elastomeric seal material.

SUMMARY OF THE INVENTION

The present invention overcomes the above-noted shortcomings of the known art by providing an integrally molded elastomeric seal element on a relatively rigid retainer to seal a fluid passageway at the interface of two mateable parts having closely spaced and generally parallel sealing surfaces. According to one aspect of the invention, the seal element has a bi-lobed construction. The first lobe extends perpendicularly from one side of the retainer and is shaped and sized to be received in a face groove or indentation of one of the two mateable parts. The seal element has a second lobe which extends inward transversely from the first lobe and is sized and shaped to have an interference fit with a boss-like projection on one of the two mateable parts. The second lobe includes an enlarged flat portion which is closely spaced from the retainer to provide a seal for the mating surface of the other of the two mateable parts.

By way of example, the two mateable parts can be any two parts that when assembled have a fluid passage that must be sealed at the interface of the mating surfaces such as a manifold, air conditioning suction/discharge ports, or a reservoir drain port with a plug, fastener, or other closure.

According to another aspect of the invention, the retainer is generally planar in structure and made of a relatively rigid material such as stamped or machined metal or molded plastic. The seal element may be secured to the retainer during the mold process either mechanically or chemically through use of a bonding agent.

Still another aspect of the present invention is that the retainer is provided with a peripheral portion that is clamped between the facing sealing surfaces of the mated parts thereby providing both a rigid load bearing surface as well as visual means to determine whether the seal element is present. The rigid retainer also simplifies assembly and insures dimensional stability thereby reducing the chance of pinching or cutting the seal element.

These and other aspects and advantages of the present invention are fully set forth and described in the detailed description of the preferred embodiments in view of the accompanying drawings.

DESCRIPTION OF PREFERRED EMBODIMENTS

Figure 1:
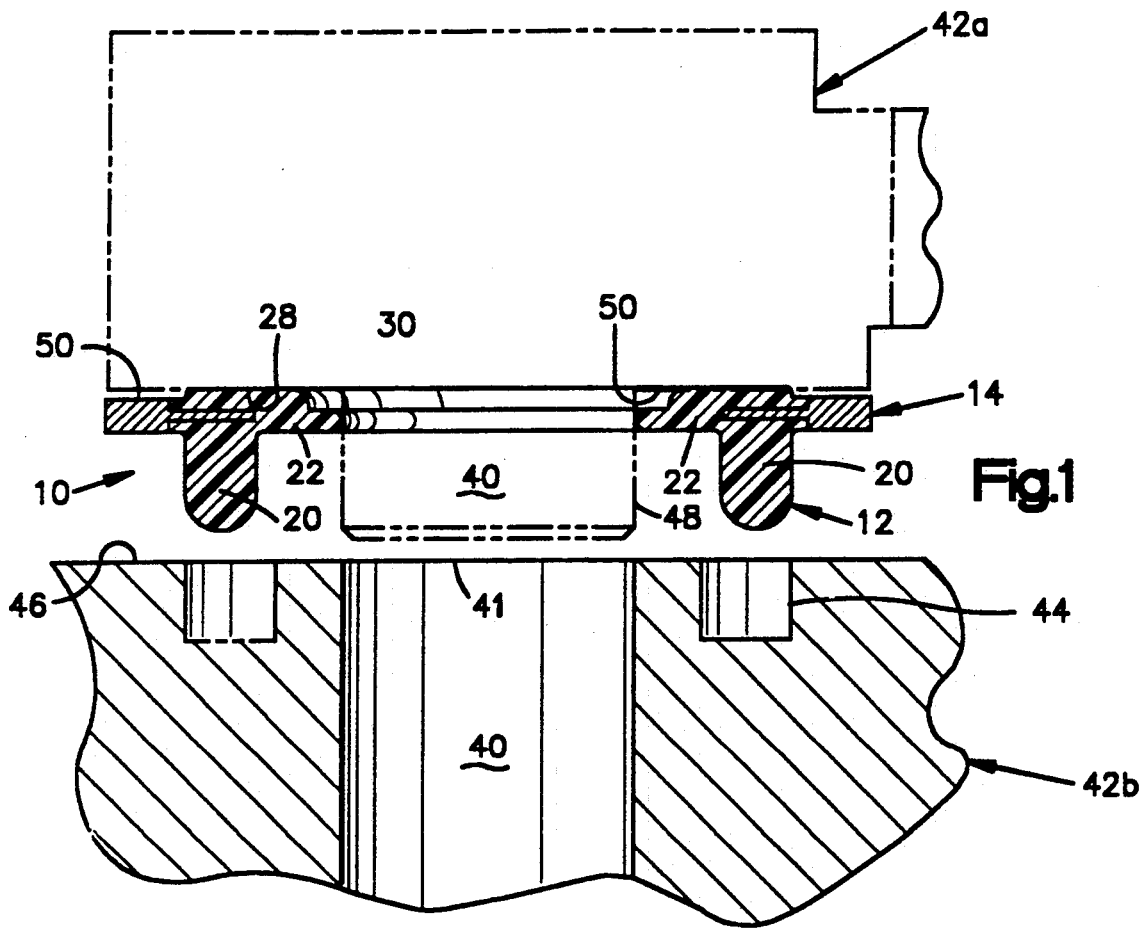
FIG. 1 is a sectional view of a sealing device according to the present invention as typically used for sealing a fluid passageway at the interface of two mateable parts.

With reference to FIG. 1, an elastomeric sealing device 10 according to the present invention is shown in a typical face seal application. The sealing device 10 comprises an elastomeric seal element 12 integrally formed on a relatively rigid retainer 14.

The sealing device 10 is ideally suited for providing a fluidtight seal about a fluid passageway 40 that extends through two mateable parts 42a and 42b. The sealing device 10 can be used as original equipment in the fluid assembly, or can be used to retrofit a conventional O-ring that originally provided the face seal between the parts 42a and 42b. In particular, one of the two mateable parts is provided with a machined or cast recessed groove or indentation 44 in its sealing mating surface 46. The groove 44 completely surrounds the fluid passageway 40 and more particularly surrounds the fluid opening or passageway 41 between the sealing surfaces at the interface of the mateable parts 42a,b. In the example shown in FIG. 1, the fluid passageway 40 is cylindrical and the groove 44 is substantially circular in plan. However, those skilled in the art will readily understand that the shape of the groove 44 or passageway 40 are of no particular significance to the present invention, and in fact can be any shape suitable to the particular application. FIG. 1 is representative of a typical application in an automotive air conditioning system for sealing the suction/discharge bosses.

One of the mateable parts is also provided with a boss 48 which defines the fluid passageway 40 therethrough. Again, insofar as the present invention is concerned, which of the two mateable parts 42a or 42b has the boss 48, or which has the recessed groove 44, is of no particular consequence, but rather is simply a matter of design choice.

Figure 3:
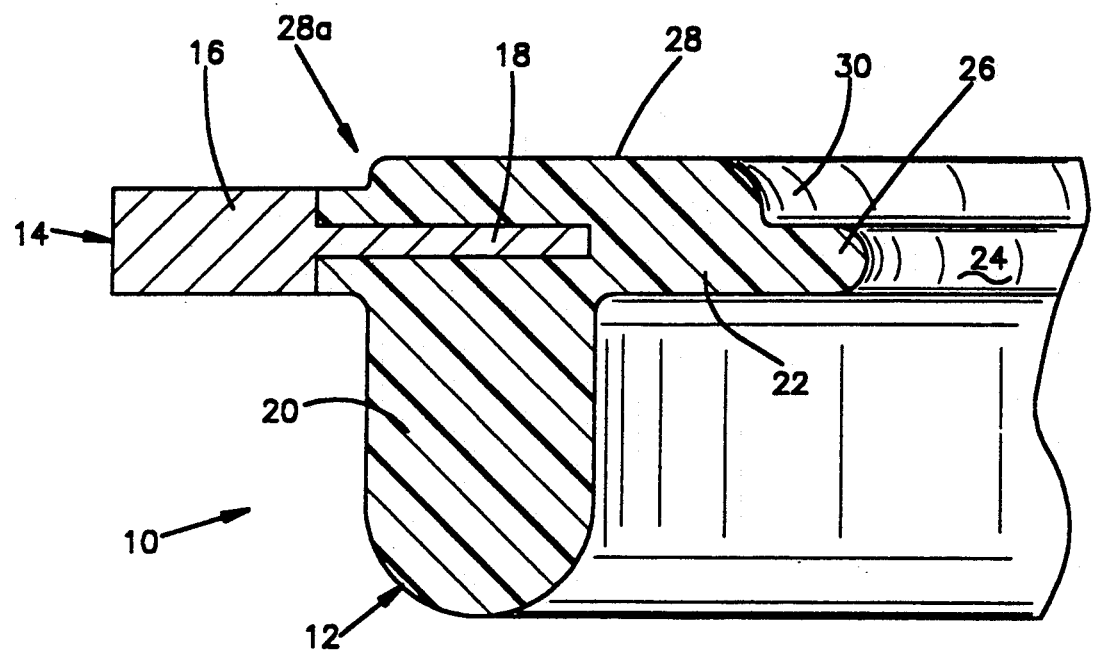
FIG. 3 is an enlarged partial cross-section of a sealing element and retainer according to the present invention.
Figure 4:
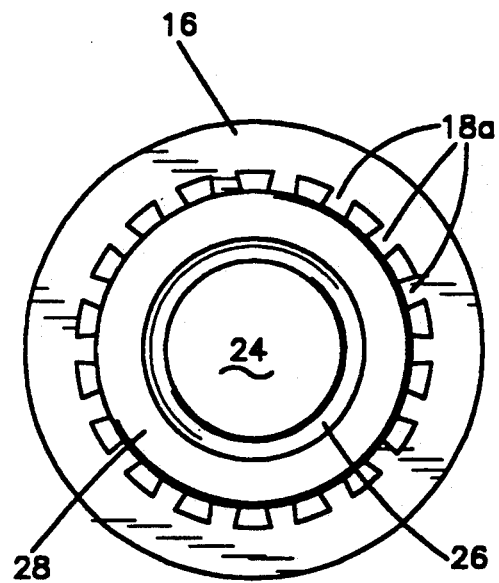
FIG. 4 is a full plan view of the sealing device shown in FIGS. 1-3.
Figure 5:
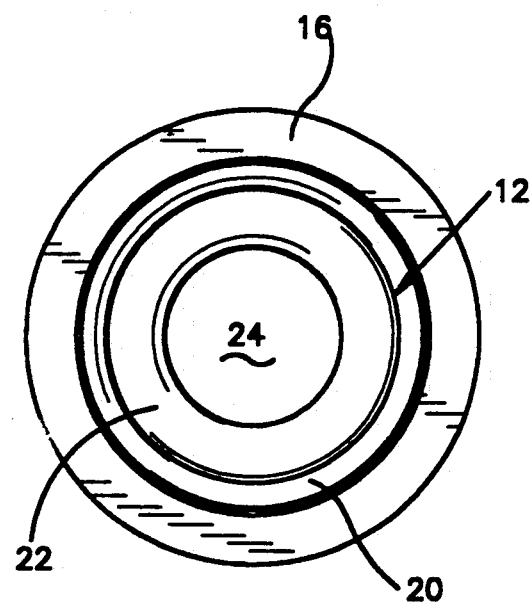
FIG. 5 is an opposite side full plan view of the sealing device shown in FIGS. 1-3.

With reference to FIGS. 3-5, a detailed description of the sealing device 10 will now be given. For simplicity, in FIG. 3 only about half of the device 10 is shown in enlarged section, it being understood that the device 10 is uniform around its entire circumference.

The retainer 14 is generally planar in construction and includes a peripheral load bearing portion 16 and a relatively thinner and inwardly extending flange portion 18. The flange 18 is embedded in the elastomeric seal 12 during the molding process so that the seal 12 is firmly affixed to the retainer. Holes (not shown) may be provided in the flange 18 to strengthen the mechanical bond between the seal 12 and the retainer 14. The flange 18 may also be provided with a plurality of splines 18a to enhance the mechanical bond between the seal 12 and the retainer 14 (FIG. 4). Furthermore, an adhesive or other chemical bonding agent (not shown) activated during the vulcanization process can be used to maximize adhesion of the elastomer to the retainer 14.

While the particular application may dictate the materials used for the sealing device 10, it has been found that steel or aluminum are particularly suited metals for the retainer 14 since such materials are easily stamped or machined to the desired shape. The elastomer for the seal 12 may be any suitable material such as neoprene, nitrile or silicone that are compatible with the fluid moving through the passageway 40. The retainer 14 may also be made of a molded plastic such as phenolic provided that the plastic is of sufficient strength to act as a load bearing device when the parts 42a,b are mated together.

The elastomeric seal 12 has a bi-lobed unitary construction (FIG. 3). The first lobe 20 extends perpendicularly from one side or surface of the planar retainer 14, and is sized and shaped, using an appropriate mold during the molding process, to be received in the groove 44 when the parts 40a,b are mated. The lobe 20 fills most, but not all, of the groove 44 void, much in the same manner that a conventional O-ring would be used in the groove 44.

The seal 12 includes a second lobe 22 which extends radially inward transversely from the first lobe 20 and thereby defines a central opening 24. The second lobe 22 has an inner peripheral nub 26 which is sized and shaped to have an interference fit with the boss 48 when the parts 42a,b are mated. The second lobe 22 further includes an enlarged relatively flat portion or crown 28 that is closely spaced from the retainer load bearing surface, as at the step 28a.

The nub portion 26 of the second lobe 22 is spaced from and of reduced thickness than the enlarged flat portion 28. This step down in thickness provides a void area 30 which permits squeeze or compression of the second lobe 22 when the parts 42a,b are mated together.

Figure 2:
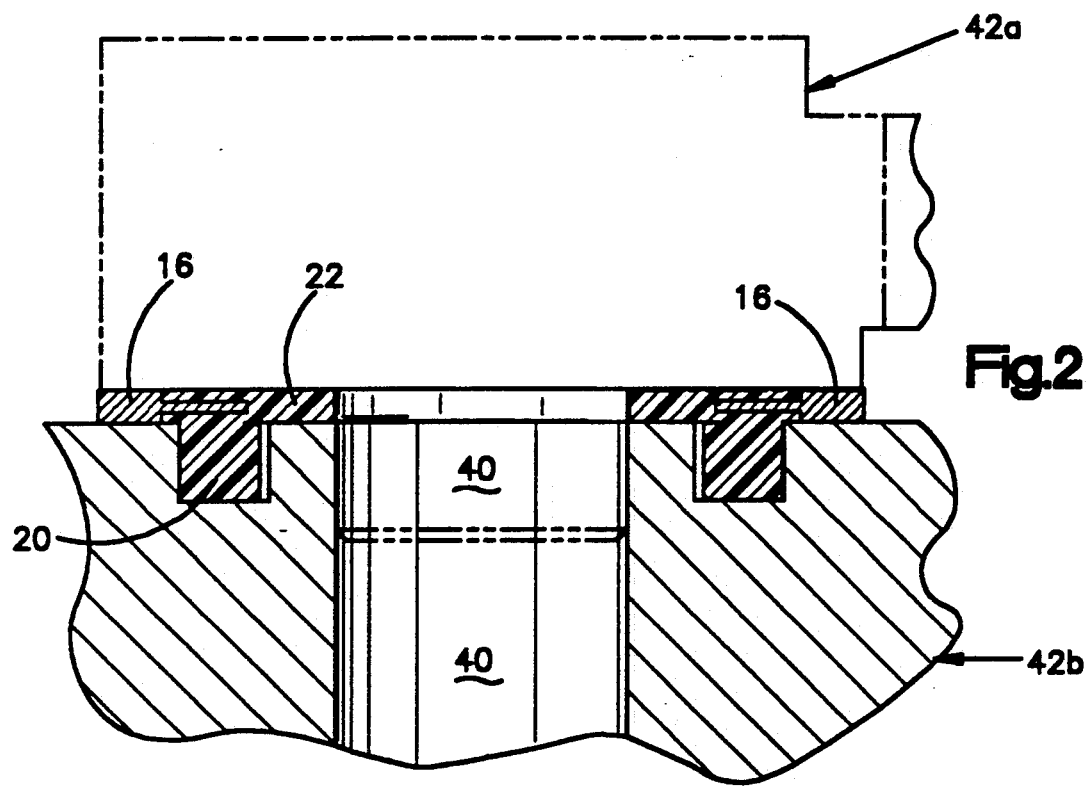
FIG. 2 is the same assembly depicted in FIG. 1 after the parts have been mated together.

With reference now to FIGS. 1 and 2, the sealing device 10 embodying the instant invention is shown installed in a conventional air conditioning port assembly. In FIG. 1, the mateable parts 42a,b are not yet made up, but the sealing device 10 has already been installed on the boss 48. Because of the snug interference fit between the nub 26 and boss 48, the sealing device 10 will not fall off during installation. The device 10 can be slid down the boss 48 until the flat portion 28 rests up against the sealing surface or face 50. As stated hereinabove, the gap 30 permits adequate squeeze of the second lobe 22 when the parts 42a,b are mated.

As shown in FIG. 2, after the mateable parts 42a,b are made up, the elastomeric seal 12 has been deformed under compression to nearly fill the groove 44 void and the void 30. The parts 42a,b can be held together in any conventional manner such as by bolts (not shown). The primary seal is of course provided by the first lobe 20 within the groove 44, much as is the case with a conventional O-ring. However, due to the dimensional stability provided by the rigid retainer and the firm fit with the boss 48, there is virtually no chance that the lobe 20 could be incorrectly positioned, pinched or otherwise damaged during installation.

After the parts 42a,b are mated, the second lobe is squeezed or compressed between the sealing surfaces 50, 46 of the parts 42a,b respectively. The compression seal around the boss 48 and along the sealing face 50 provides a redundant backup seal to the primary seal in the groove 44, thereby ensuring a fluidtight seal.

The load bearing portion 16 of the retainer 14 provides an important rigid load transfer area that is securely clamped between the sealing surfaces of the mated parts. This insures joint integrity and prevents torque loss due to relaxation, creep or cold flow (as would typically occur with a conventional O-ring or if there were no retainer present).

The retainer further provides an easy and definite visual indication that the sealing device 10 has in fact been installed. The retainer provides dimensional stability thereby greatly simplifying both "blind" installation as well as making automated installation feasible.

Other advantages of this design is the retainer 14 can be part of a larger matrix for applications wherein there are numerous ports or passageways requiring a fluidtight seal. The sealing device 10 is useful in both hydraulic and pneumatic applications over a wide range of pressures.

While the use of a boss such as shown in FIGS. 1 and 2 commonly occurs in many systems, such a feature clearly is not essential to the instant invention. The central opening 24 provides a fluid connection between the mated parts 42a,b whether a boss 48 is present or not; and the device 10 provides the primary and redundant seals in both situations. The boss 48 simply provides a convenient way for the device 10 to be aligned and installed. Alternatively, the sealing device 10 could first be placed into the recess 44 and in most cases would remain in place even if the part 42b were turned 180 degrees from the position shown in FIG. 1. Again, the retainer 14 provides dimensional stability for such installation as well as a visual check that the sealing device 10 is present.

Figure 6:
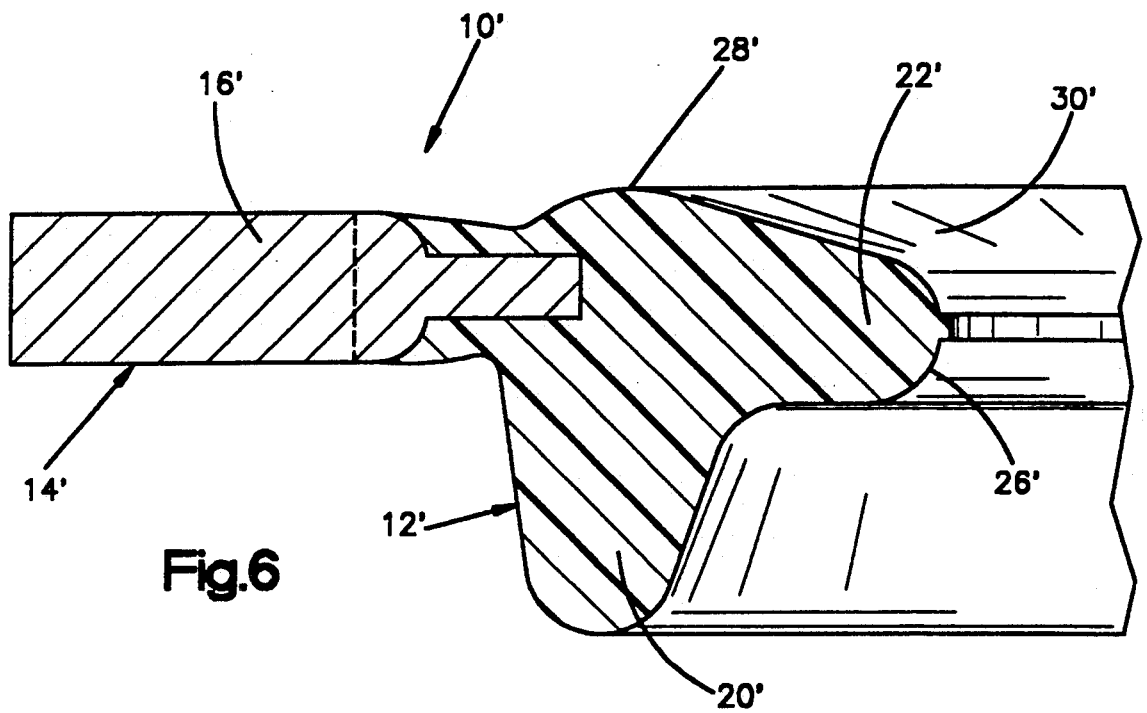
FIG. 6 is a partial cross-section of another embodiment of a sealing device according to the present invention.
Figure 7:
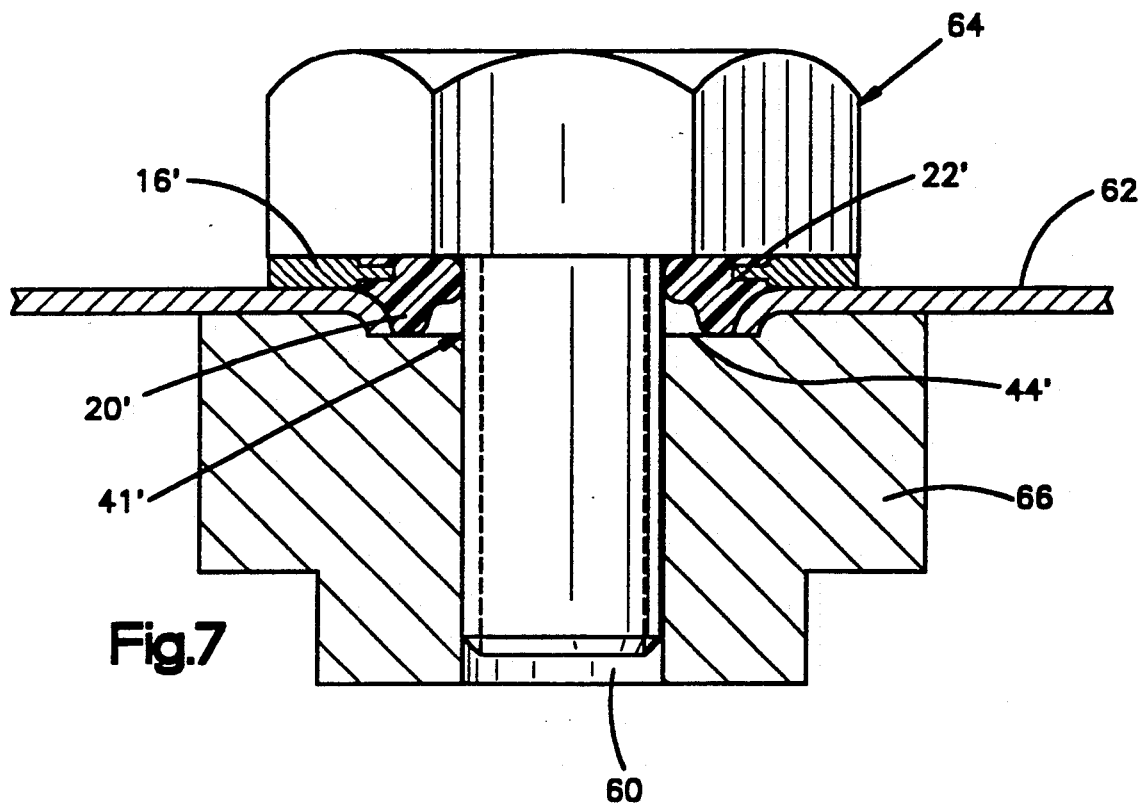
FIG. 7 is a sectional view of the embodiment shown in FIG. 6 in a typical application thereof.

Referring now to FIGS. 6 and 7, there is shown an alternative embodiment in which the sealing device 10' is used to seal an opening such as drain hole 60 in an oil pan 62. In this case, the hole is typically sealed using a conventional threaded plug or bolt 64 and mating spac-nut 66. The sealing device 10' has a slightly different shape to provide an optimum seal but the basic construction is the same as described with reference to FIGS. 1-5. Accordingly, like parts are given the same number with a prime (') mark.

Thus, sealing device 10' comprises a relatively rigid retainer 14' to which is integrally molded a bi-lobed elastomeric seal 12'. The first lobe 20' extends through the fluid passageway and seals within a recess or counterbore 44' against the upper surface of the spac-nut 66. The second lobe 22' seals against the threaded shank of the plug 64 as well as the facing seal surface of the underside of the plug 64 cap. Again, the peripheral portion 16' of the retainer 14' provides a rigid load bearing area between the plug 64 and the oil pan.

The void area 30' is formed by using an angled surface between the flat portion 28', which is slightly spaced from the load bearing portion 16' of the retainer, and the innermost portion 26' of the second lobe 22'.

This angled surface design is used to ensure adequate void independent of normal tolerances for example in the depth of the counterbore 44. One feature that should be particularly noted in this embodiment is that the invention can be used in an application where the mated parts do not necessarily result in a fluid conduit or flow-through, but rather is used to seal the fluid opening 41' at the interface of the mated parts.

While the invention has been shown and described with respect to a particular embodiment thereof, this is for the purpose of illustration rather than limitation, and other variations and modifications of the specific embodiments herein shown and described will be apparent to those skilled in the art all within the intended spirit and scope of the claimed invention.

What is claimed is:

1. An elastomeric sealing device for sealing a fluid passageway at the interface of two mateable parts wherein each of said mateable parts has a flat sealing surface which is in a close parallel facing relationship with the other sealing surface when the parts are mated together, and wherein one of said mateable parts has a groove formed in the sealing surface thereof which surrounds the fluid passageway and either one of said mateable parts has a boss which extends from the sealing surface thereof into the fluid passageway of the other part when the parts are mated together, said sealing device comprising: a bi-lobed elastomeric seal integrally molded on a relatively rigid retainer, said retainer and seal having a central opening therethrough which closely conforms to the shape of the fluid passageway at the interface of the mateable parts, said retainer being generally planar in construction with a load bearing peripheral portion that is clamped between the sealing surfaces of the mated parts, and a thinner flange portion which extends inwardly from the inner edge of said peripheral portion towards said central opening, said bi-lobed seal being of unitary construction molded about said retainer flange portion, said seal having a first lobe which extends perpendicularly from one surface of said retainer flange portion and is shaped and sized to be received in said groove and to sealingly fill most of the void in said groove when the parts are mated together, said seal having a second lobe which extends from said flange transverse said first lobe and defines said central opening, said second lobe being sized and shaped to have an interference fit with said boss to position said first lobe in said groove when the parts are mated together, said second lobe having a flat portion closely spaced from said retainer load bearing peripheral portion to seal the surface of the mated part which faces said groove.

2. A sealing device according to claim 2 wherein said second lobe has an inclined surface portion that extends between said second lobe portion closely spaced from said retainer load bearing surface and said central opening.

3. A sealing device according to claim 1 wherein said groove surrounds and is spaced from the fluid passageway.

4. A sealing device according to claim 5 wherein the portion of said second lobe which fits around the boss is spaced from and of reduced thickness than said flat portion so as to form a void which is substantially filled when the second lobe is squeezed between the sealing surfaces of the mated parts.

5. A sealing device according to claim 3 wherein said groove is circular about the fluid passageway to provide an o-ring face seal interface when the parts are mated together, said seal first lobe being shaped substantially as an o-ring.

* * * * *